(12) United States Patent
Hepkin et al.

(10) Patent No.: US 8,195,867 B2
(45) Date of Patent: Jun. 5, 2012

(54) CONTROLLED SHUT-DOWN OF PARTITIONS WITHIN A SHARED MEMORY PARTITION DATA PROCESSING SYSTEM

(75) Inventors: David A. Hepkin, Austin, TX (US); Carol B. Hernandez, Austin, TX (US); Andrew T. Koch, Rochester, MN (US); Kyle A. Lucke, Oronoco, MN (US); Naresh Nayar, Rochester, MN (US); Jorge R. Nogueras, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 12/403,472

(22) Filed: Mar. 13, 2009

(65) Prior Publication Data

US 2009/0307441 A1 Dec. 10, 2009

Related U.S. Application Data

(60) Provisional application No. 61/059,492, filed on Jun. 6, 2008.

(51) Int. Cl.
*G06F 12/08* (2006.01)
(52) U.S. Cl. ............ 711/6; 711/153; 711/173; 711/203; 711/E12.016
(58) Field of Classification Search .................. None
See application file for complete search history.

(56) References Cited

U.S. PATENT DOCUMENTS

| | | |
|---|---|---|
| 5,909,540 A | 6/1999 | Carter et al. |
| RE36,462 E | 12/1999 | Chang et al. |
| 6,769,017 B1 | 7/2004 | Bhat et al. |
| 6,976,137 B2 | 12/2005 | Ouren et al. |
| 7,506,095 B2 | 3/2009 | Otte et al. |
| 7,680,754 B2 | 3/2010 | Hillier |
| 7,698,531 B2 | 4/2010 | Flemming et al. |
| 7,702,843 B1 | 4/2010 | Chen et al. |
| 7,849,347 B2 | 12/2010 | Armstrong et al. |
| 2002/0010844 A1 | 1/2002 | Noel et al. |
| 2002/0087611 A1 | 7/2002 | Tanaka et al. |

(Continued)

OTHER PUBLICATIONS

Jacob Faber Kloster et al. "Efficient Memory Sharing in the Xen Virtual Machine Monitor." Jan. 2006. Department of Computer Science, Aalborg University.*

(Continued)

*Primary Examiner* — Reginald Bragdon
*Assistant Examiner* — Nathan N Sadler
(74) *Attorney, Agent, or Firm* — Heslin Rothenberg Farley & Mesiti, P.C.

(57) ABSTRACT

Controlled partition shut-down is provided within a shared memory partition data processing system including a shared memory partition, a paging service partition, a hypervisor and a shared memory pool within physical memory. The hypervisor manages access to logical pages within the pool and page-out of pages from the pool to external paging storage via the paging service partition. A respective paging service stream exists between the paging service partition and hypervisor for each shared memory partition, with each stream including a stream state. The control method includes: responsive to a shut-down initiating event, notifying the paging service partition to shut down, and determining whether a shared memory partition is currently active, and if so, signaling the hypervisor to complete paging activity for the active memory partition and waiting for its stream state to enter a suspended or a completed state before automatically shutting down the paging service partition.

20 Claims, 9 Drawing Sheets

U.S. PATENT DOCUMENTS

| | | | |
|---|---|---|---|
| 2002/0138704 | A1 | 9/2002 | Hiser et al. |
| 2003/0084372 | A1 | 5/2003 | Mock et al. |
| 2004/0139287 | A1 | 7/2004 | Foster et al. |
| 2004/0193861 | A1 | 9/2004 | Michaelis |
| 2004/0199599 | A1* | 10/2004 | Nichols et al. ............... 709/208 |
| 2005/0071446 | A1 | 3/2005 | Graham et al. |
| 2005/0160151 | A1* | 7/2005 | Rawson ..................... 709/213 |
| 2005/0240932 | A1* | 10/2005 | Billau et al. ................ 718/104 |
| 2005/0278719 | A1 | 12/2005 | Togawa |
| 2006/0075207 | A1 | 4/2006 | Togawa et al. |
| 2006/0101224 | A1 | 5/2006 | Shah et al. |
| 2006/0123217 | A1 | 6/2006 | Burdick et al. |
| 2006/0146057 | A1* | 7/2006 | Blythe ........................ 345/506 |
| 2006/0236059 | A1 | 10/2006 | Fleming et al. |
| 2007/0061441 | A1 | 3/2007 | Landis et al. |
| 2007/0112999 | A1* | 5/2007 | Oney et al. ..................... 711/6 |
| 2007/0168635 | A1 | 7/2007 | Allen et al. |
| 2007/0210650 | A1* | 9/2007 | Togashi ........................ 307/43 |
| 2007/0299990 | A1 | 12/2007 | Ben-Yehuda et al. |
| 2008/0040565 | A1 | 2/2008 | Rozas et al. |
| 2008/0071755 | A1 | 3/2008 | Barsness et al. |
| 2008/0082696 | A1 | 4/2008 | Bestler |
| 2008/0082975 | A1* | 4/2008 | Oney et al. ..................... 718/1 |
| 2008/0183996 | A1* | 7/2008 | Field et al. .................. 711/163 |
| 2008/0256321 | A1 | 10/2008 | Armstrong et al. |
| 2008/0256327 | A1 | 10/2008 | Jacobs et al. |
| 2008/0256530 | A1 | 10/2008 | Armstrong et al. |
| 2009/0100237 | A1 | 4/2009 | Orikasa et al. |
| 2009/0144510 | A1 | 6/2009 | Wibling et al. |
| 2009/0307436 | A1 | 12/2009 | Larson et al. |
| 2009/0307438 | A1 | 12/2009 | Logan et al. |
| 2009/0307439 | A1 | 12/2009 | Jacobs et al. |
| 2009/0307440 | A1 | 12/2009 | Jacobs et al. |
| 2009/0307445 | A1 | 12/2009 | Jacobs et al. |
| 2009/0307447 | A1 | 12/2009 | Jacobs et al. |
| 2009/0307688 | A1 | 12/2009 | Pafumi et al. |
| 2009/0307690 | A1 | 12/2009 | Logan et al. |
| 2009/0307713 | A1* | 12/2009 | Anderson et al. ............. 719/313 |
| 2010/0079302 | A1 | 4/2010 | Eide et al. |
| 2010/0083252 | A1 | 4/2010 | Eide et al. |

OTHER PUBLICATIONS

Carl A. Waldspurger. "Memory Resource Management in VMware ESX Server." Dec. 2002. ACM. OSDI '02.*

Notice of Allowance for U.S. Appl. No. 12/403,426 (U.S. Patent Publication No. 2009/0307438 A1) dated Nov. 7, 2011.*

Office Action for U.S. Appl. No. 12/403,408 (Application No. US-2009-0307436-A1) dated Jul. 15, 2011.

Office Action for U.S. Appl. No. 12/403,485 (U.S. Patent Publication No. 2009/0307447 A1), dated Apr. 28, 2011.

Office Action for U.S. Appl. No. 12/403,447 (U.S. Patent Publication No. 2009/0307440 A1), dated May 11, 2011.

Valdez, E. et al., "Retrofitting the IBM POWER Hypervisor to Support Mandatory Access Control", 23rd Annual Computer Security Applications Conference (pp. 221-230) (2007).

Kloster, Jacob Faber et al. "Efficient Memory Sharing in the Xen Virtual Machine Monitor", Department of Computer Science, Aalborg University (Jan. 2006).

Waldspurger, Carl A., "Memory Resource Management in VMware ESX Server." ACM, OSDI '02, (Dec. 2002).

Notice of Allowance for U.S. Appl. No. 12/403,447 (U.S. Patent Publication No. 2009/0307440 A1), dated Oct. 18, 2011.

Office Action for U.S. Appl. No. 12/403,440 (U.S. Patent Publication No. 2009/0307439 A1), dated Oct. 27, 2011.

Office Action for U.S. Appl. No. 12/403,402 (U.S. Patent Publication No. 2009/0307713 A1), dated Nov. 30, 2011.

IBM International Technical Support Organization, "HiperSockets Implementation Guide", pp. 1-132 (Mar. 2007).

Office Action for U.S. Appl. No. 12/403,485 (U.S. Patent Publication No. 2009/0307447 A1), dated Oct. 7, 2011.

* cited by examiner

CONTROLLED SHUT-DOWN OF PARTITIONS WITHIN A SHARED MEMORY PARTITION DATA PROCESSING SYSTEM

CROSS-REFERENCE TO RELATED APPLICATION

This application claims the benefit of U.S. provisional application Ser. No. 61/059,492, filed Jun. 6, 2008, entitled "Virtual Real Memory", the entirety of which is incorporated herein by reference.

TECHNICAL FIELD

The present invention relates generally to data processing systems, and more particularly, to controlled shut-down of partitions within the hypervisor-managed paging environment of a shared memory partition data processing system.

BACKGROUND OF THE INVENTION

Logical partitions (LPARs) running atop a hypervisor of a data processing system are often used to provide higher-level function than provided by the hypervisor itself. For example, one LPAR may be designated a virtual input/output server (VIOS), which provides input/output (I/O) services to one or more other LPARs of the data processing system. This offloading of higher-level function avoids complex code in the hypervisor, and thus, assists in maintaining the hypervisor small and secure within the data processing system.

Currently, the number of logical partitions (LPARs) that may be created on a partitionable server of the data processing system is bound by the amount of real memory available on that server. That is, if the server has 32 GBs of real memory, then once the partitions have been created and have been allocated those 32 GBs of real memory, no further logical partitions can be activated on that server. This places restriction on those configurations where a customer may wish to have, for example, hundreds of logical partitions on one partitionable server.

Partitioned computing platforms have led to challenges to fully utilize available resources in the partitioned server. These resources, such as processor, memory and I/O, are typically assigned to a given partition and are therefore unavailable to other partitions on the same platform. Flexibility may be added by allowing the user to dynamically remove and add resources, however, this requires active user interaction, and can therefore be cumbersome and inconvenient. Also, memory is difficult to fully utilize in this way since there are frequently large amounts of infrequently accessed memory in idle partitions. However, that memory needs to be available to the operating system(s) to handle sudden spikes in workload requirements.

SUMMARY OF THE INVENTION

To address this need, the concept of a shared memory partition has been created. A shared memory partition's memory is backed by a pool of physical memory in the server that is shared by other shared memory partitions on that server. The amount of physical memory in the pool is typically smaller than the sum of the logical memory assigned to all of the shared memory partitions using the pool to allow the memory to be more fully utilized. Idle and/or less active logical memory in the shared memory partitions that does not fit in the physical shared memory pool is paged out by the hypervisor to a cheaper and more abundant form of storage via an entity external to the hypervisor known as a paging service partition, which may be one implementation of a VIOS partition. The paging service partition must be operational for the shared memory partitions to function properly. During a system shut-down event or uninterrupted power supply (UPS) event, care must be taken to ensure that the paging service partition is operational while the shared memory partitions are being shut down. Described herein are various approaches to accomplishing this controlled partition shut-down.

Provided herein, in one aspect, is a method of controlling partition shut-down within a shared memory partition data processing system. The method includes: responsive to a shut-down initiating event within a shared memory partition data processing system comprising at least one shared memory partition, a paging service partition, and a hypervisor, notifying the paging service partition to shut down, wherein the shared memory partition data processing system further includes a shared memory pool within physical memory, the hypervisor managing access to logical memory pages within the shared memory pool and managing page-out of logical memory pages from the shared memory pool to one or more external paging devices via the paging service partition, and wherein a respective paging service stream exists between the paging service partition and the hypervisor for each shared memory partition of the at least one shared memory partition, each paging service stream including a stream state; and responsive to the notifying, determining whether a shared memory partition of the at least one shared memory partition is active, and if yes, signaling the hypervisor to complete paging activity for each shared memory partition that is active, and waiting for the stream state associated with each active shared memory partition to enter one of a suspended state or a completed state before automatically shutting down the paging service partition.

In another aspect, a shared memory partition data processing system is provided having partition shut-down control. The shared memory partition data processing system includes at least one processing unit supporting at least one shared memory partition, a paging service partition, and a hypervisor. Additionally, the data processing system includes a shared memory pool defined within physical memory of the system. The hypervisor manages access to logical memory pages within the shared memory pool and manages page-out of logical memory pages from the shared memory pool to one or more external paging devices via the paging service partition. A respective paging service stream exists between the paging service partition and the hypervisor for each shared memory partition of the at least one shared memory partition, with each paging service stream including a stream state. Partition shut-down within the processing system is controlled by the hypervisor notifying the paging service partition to shut down responsive to a shut-down initiating event within the shared memory partition data processing system. The paging service partition responds thereto by determining whether a shared memory partition of the at least one shared memory partition is active, and if so, by signaling the hypervisor to complete paging activity for each shared memory partition that is active, and waiting for the stream state associated with each active shared memory partition to enter one of a suspended state or a completed state before automatically shutting down.

In a further aspect, an article of manufacture is provided which includes at least one computer-readable medium having computer-readable program code logic to control partition shut-down within a shared memory partition data processing system. The computer-readable program code logic when executing on a processor performing: responsive to a shut-down initiating event within a shared memory partition data processing system comprising at least one shared memory partition, a paging service partition, and a hypervisor, notifying the paging service partition to shut down. Wherein the shared memory partition data processing system further comprises a shared memory pool within physical memory, the hypervisor managing access to logical memory pages within the shared memory pool and managing page-out of logical memory pages from the shared memory pool to one or more external paging devices via the paging service partition, and wherein a respective paging service stream exists between the paging service partition and the hypervisor for each shared memory partition of the at least one shared memory partition, each paging service stream having an associated stream state; and responsive to the notifying, determining whether a shared memory partition of the at least one shared memory partition is active, and if yes, signaling the hypervisor to complete paging activity for each shared memory partition that is active, and waiting for the stream state associated with each active shared memory partition to enter one of a suspended state or a completed state before automatically shutting down the paging service partition.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
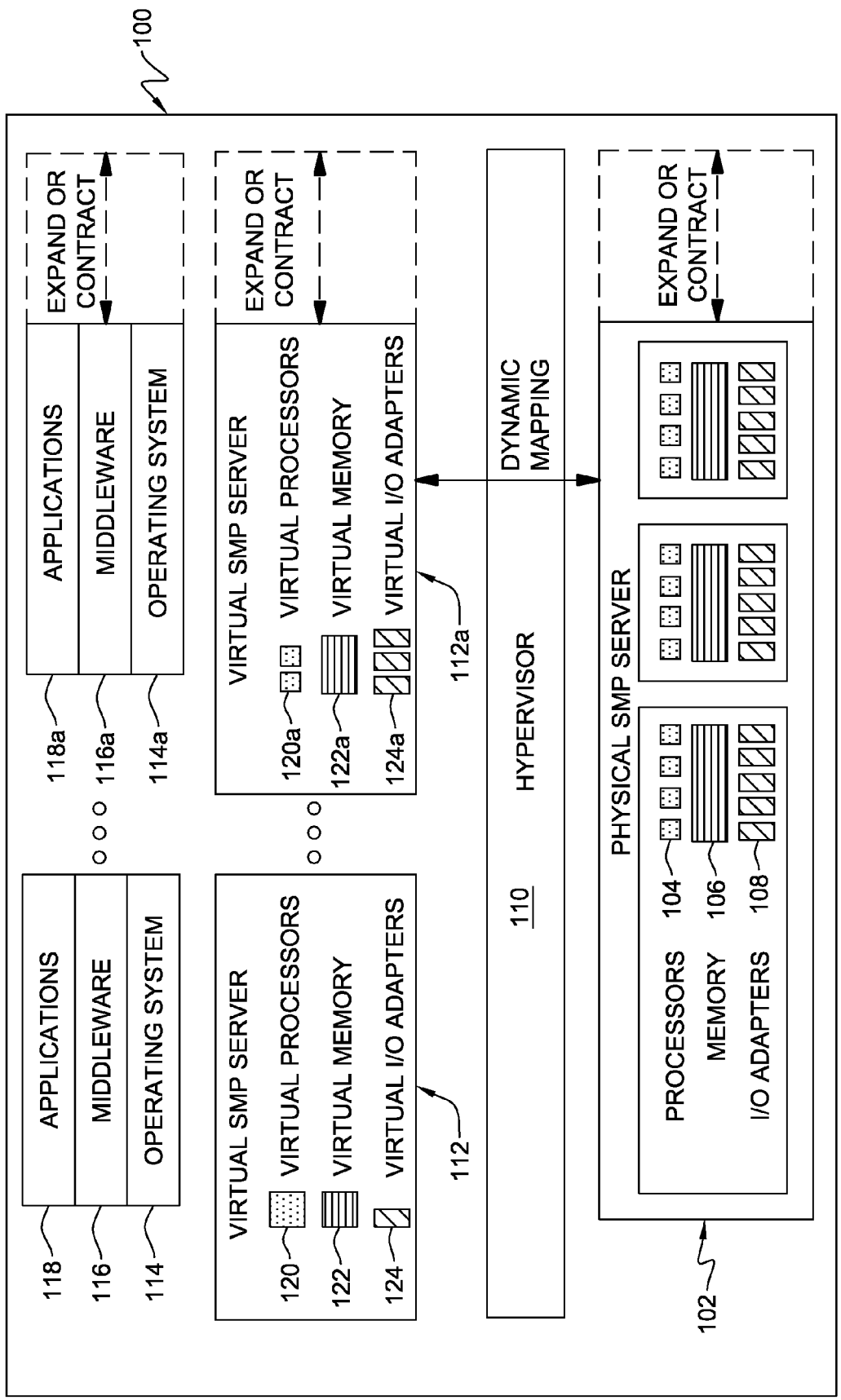
FIG. 1 is a block diagram of one embodiment of a data processing system to implement one or more aspects of the present invention.

FIG. 1 is a block diagram of a data processing system 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processor 104, memory 106, and I/O adapters 108. These physical devices are managed by hypervisor 110. Processors 104 are shared processors and each may be a simultaneous multithreading (SMT)-capable processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
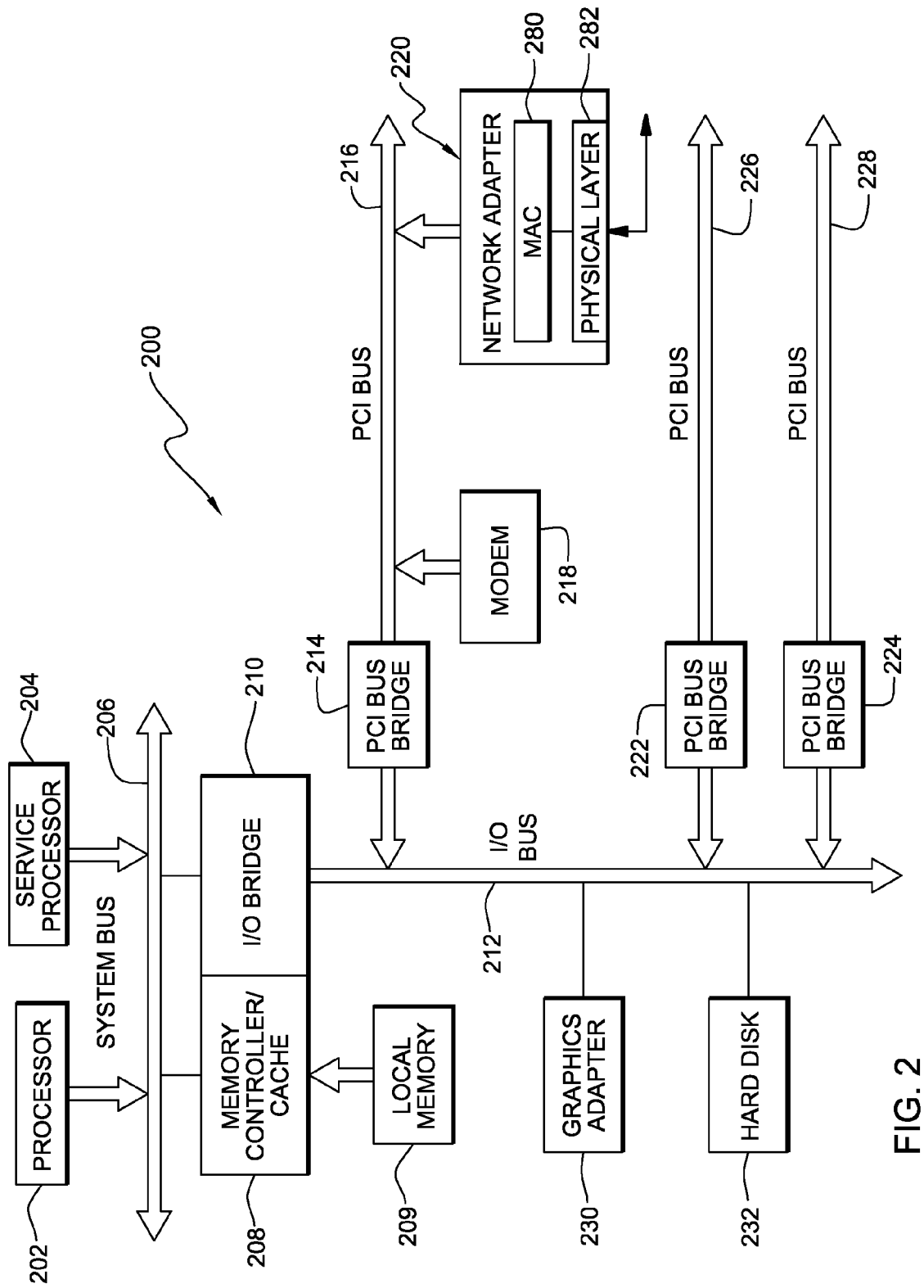
FIG. 2 is a more detailed illustration of a data processing system which could be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, a shared memory partition data processing system implementing hypervisor-managed paging such as described hereinbelow can be built upon technologies found in IBM's p/i Series product line firmware and systemware, as described in the "Power Architecture Platform Reference" (PAPR) material at Power.org (http://www.power.org/members/developers/specs/PAPR_Version_2.7_09Oct.07.pdf), which is hereby incorporated herein by reference. In addition, a virtual input/output server (VIOS) is commercially available as part of a PowerVM computing system offered by International Business Machines Corporation. The VIOS allows sharing of physical resources between logical partitions, including virtual SCSI and virtual networking. This allows more efficient utilization of physical resources through sharing between logical partitions and facilitates server consolidation. (IBM, pSeries, iSeries and PowerVM are registered trademarks of International Business Machines Corporation, Armonk, N.Y., U.S.A. Other names used herein may be registered trademarks, trademarks, or product names of International Business Machines Corporation or other companies.)

Figure 3:
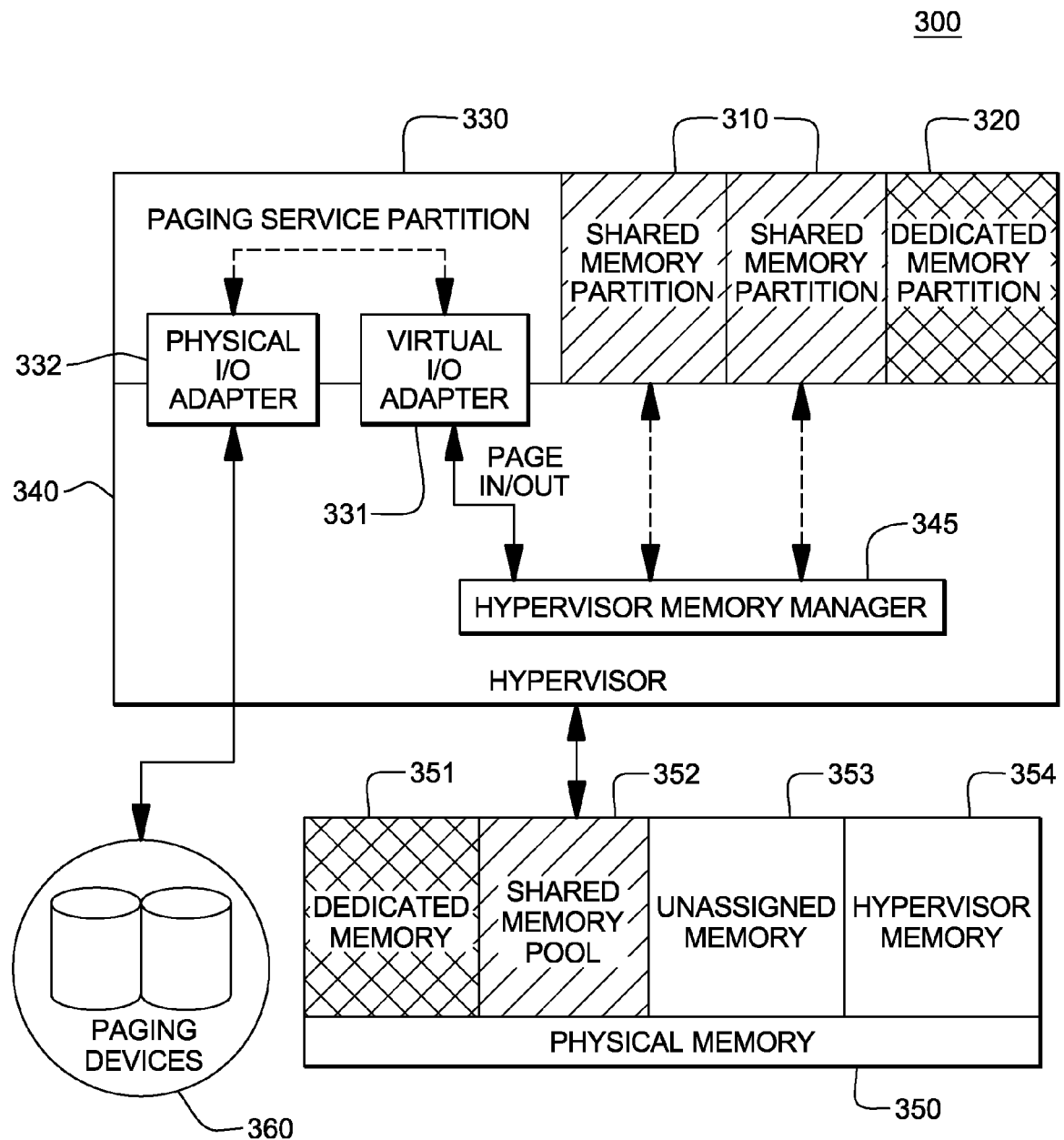
FIG. 3 illustrates one embodiment of a data processing system comprising multiple shared memory partitions employing a shared (or common) memory pool defined within physical memory of the data processing system, in accordance with an aspect of the present invention.

As noted, partition computing platforms have presented challenges to fully utilize available resources in the partitioned server. One approach to achieving this goal has been the creation of a shared memory partition data processing system, generally denoted 300, such as depicted in FIG. 3. As illustrated, shared memory partition data processing system 300 includes (in one embodiment) one or more shared memory partitions 310, each of which comprises one or more virtual processors, which interface through a hypervisor 340, and more particularly, a hypervisor memory manager 345, to a shared memory pool 352 within physical memory 350 of the shared memory partition data processing system 300. The amount of physical memory in the pool is typically smaller than the sum of the logical memory assigned to all of the shared memory partitions 310 utilizing the shared memory pool to allow the memory to be more fully employed. Idle and/or less active logical memory of one or more shared memory partitions that does not fit in the shared memory pool 352 is paged out by the hypervisor to a more abundant, less expensive storage (such as disk storage), via a paging service partition 330. Paging service partition 330 is an enhanced virtual input/output service (VIOS) partition configured to facilitate page-out and page-in of logical memory pages from or to, respectively, the shared memory pool. Paging-out and paging-in of logical memory pages is via a virtual input/output adapter 331 interfacing hypervisor memory manager 345 and paging service partition 330, and a physical input/output adapter 332 interfacing paging service partition 330 and external storage (i.e., external paging devices) 360.

For completeness, also shown in FIG. 3 is a dedicated memory partition 320 which employs dedicated memory 351 within physical memory 350. Physical memory 350 further includes unassigned memory 353 and hypervisor memory 354. The volume of memory within shared memory pool 352 may be dynamically allocated between the shared memory partitions 310 into sub-volumes or sets of physical pages to accommodate workloads. These dynamically allocated (or dynamically adjusted) sub-volumes or sets of physical pages in the shared memory pool are associated with the multiple logical partitions and may comprise contiguous or disparate physical memory locations within the shared memory pool. A physical memory page of the shared memory pool becomes part of a sub-volume of a particular logical partition when a logical memory page thereof is associated with or mapped to that physical page. Also, although referred to as a shared memory pool, in reality, there is no concurrent sharing of access to a physical page per se, but rather a sharing of the set amount of physical memory in the pool. Each shared memory partition with at least one logical memory page mapped to a physical memory page in the pool has an associated sub-volume or set of physical memory of the shared memory pool.

The hypervisor utilizes the shared memory pool in combination with the virtual input/output adapter connection to handle paging operations for the shared memory partitions. The hypervisor memory manager manages which physical pages map to which logical memory pages of a given shared memory partition. The management of these pages is transparent to the shared memory partitions and handled fully by the hypervisor. When a logical page is required by the shared memory partition and it does not have a physical mapping in the shared memory pool, the hypervisor treats this request to access as an internal fault (i.e., a hypervisor page fault). In response to a hypervisor page fault for a logical memory page that is not resident in the shared memory pool, an I/O paging request is allocated by the hypervisor from a pool of free I/O paging requests and sent via the paging service partition to the external page storage of the data processing system to request the needed memory page. The partition's virtual processor encountering the hypervisor page fault is concurrently placed into a wait state, which blocks further execution of the virtual processor until the I/O paging request is satisfied, or if the hypervisor page fault occurred while external interrupts were enabled for the virtual processor, until an external or timer interrupt occurs. The I/O paging request is submitted to the virtual I/O adapter of the paging service partition, which communicates with the paging service partition in order to retrieve and return the correct contents of the logical memory page to fulfill the hypervisor page fault. The same process is also used by the hypervisor memory manager to free up a physical page within the shared memory pool currently mapped to a logical memory page of a shared memory partition, for example, when needed by either that shared memory partition or another shared memory partition.

Figure 4:
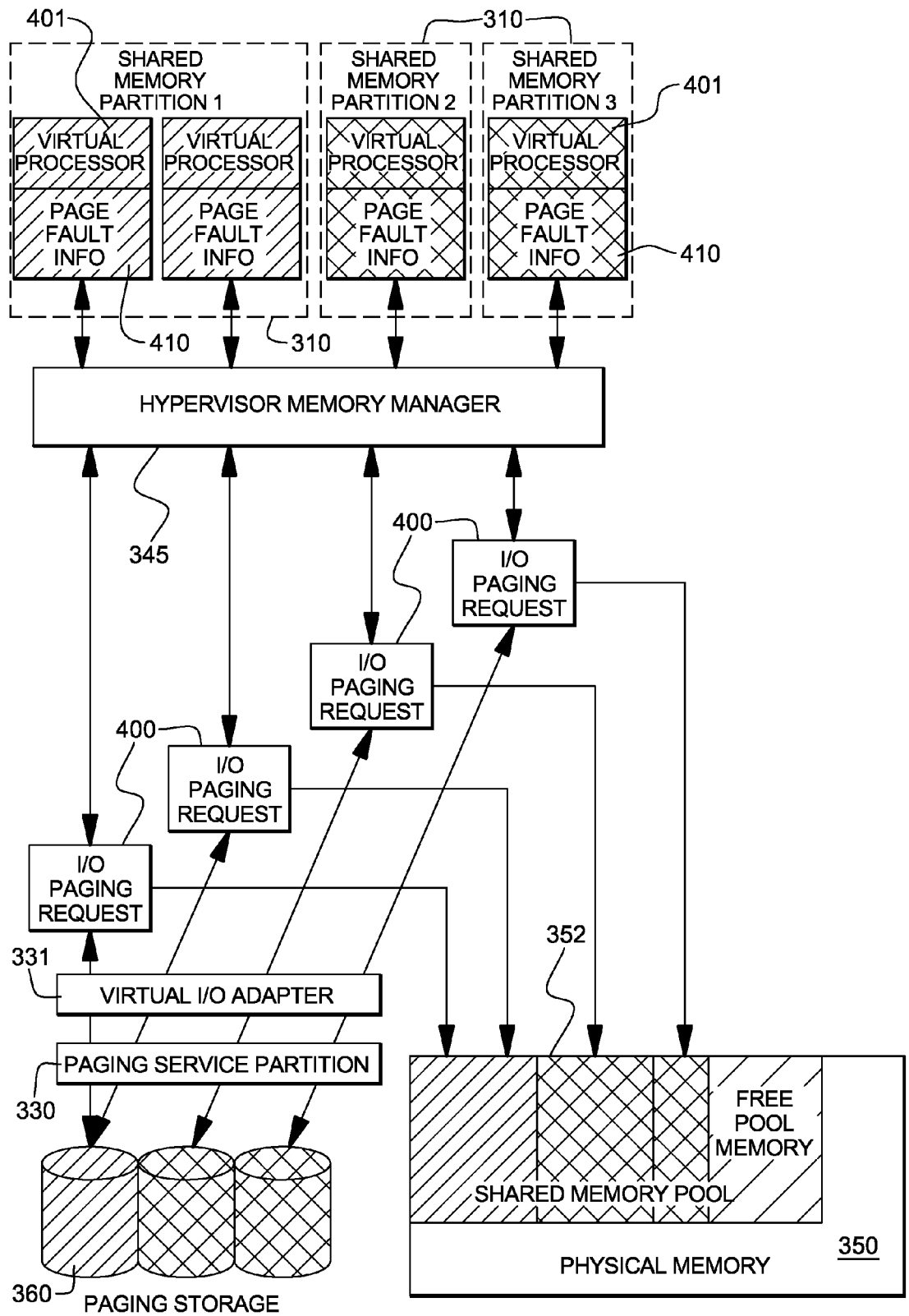
FIG. 4 illustrates one embodiment of an approach for handling hypervisor page faults within a shared memory partition data processing system, such as depicted in FIG. 3, in accordance with an aspect of the present invention.

FIG. 4 illustrates one operational embodiment of handling hypervisor page faults within a shared memory partition data processing system such as described above in connection with FIG. 3. In this embodiment, three shared memory partitions 310, i.e., shared memory partition 1, shared memory partition 2 & shared memory partition 3, are illustrated, each comprising one or more virtual processors 401, and each encountering a hypervisor page fault 410. Each hypervisor page fault is responsive to a request by a virtual processor 401 for a logical memory page that is not resident in the shared memory pool 352 of physical memory 350. Shared memory partitions have a range of logical memory pages. Each logical memory page may or may not currently have a physical memory page assigned to it within the shared memory pool. This assignment is referred to as page mapping. The hypervisor memory manager manages the page mappings for the shared memory partitions within the data processing system that are assigned to the shared memory pool. This management is transparent to the shared memory partitions 310, and the hypervisor memory manager performs paging I/O operations through one or more virtual I/O adapters and the paging service partition without the knowledge or intervention of the shared memory partitions (or shared memory partition threads) requesting the logical memory pages. The complete memory contents for a shared memory partition are stored on external storage (i.e., the external paging devices) and accessed through the virtual I/O connection between the hypervisor memory manager and the paging service partition. Each shared memory partition is assigned a paging service stream (or partition service) in the virtual I/O connection. This paging service stream (or partition service) is used to identify which external storage device is being used for the particular shared memory partition requesting a logical memory page which is absent from the shared memory pool. Further detail on paging service streams (or partition services) is provided in co-filed, commonly assigned U.S. Ser. No. 12/403,416, entitled "Managing Assignment of Partition Services to Virtual Input/Output Adapters", the entirety of which is hereby incorporated herein by reference.

Responsive to each fault, hypervisor memory manager 345 allocates an I/O paging request 400 and forwards, via virtual I/O adapter 331 and paging service partition 330, the I/O paging request to the external paging storage or device(s) 360 to request the needed page. Concurrent with requesting the needed page, the partition's virtual processor (e.g., the executing partition thread) encountering the hypervisor page fault is placed into a wait state.

As noted briefly above, in order to ensure safe shut-down of partitions within a shared memory partition data processing system such as described above in connection with FIGS. 1-4, the paging service partition must remain operational during shut-down of the associated shared memory partitions. This is because the paging service partition needs to satisfy any paging requests that the shared memory partitions have while being shut down. In order to accomplish this, virtual input/output (VIO) adapter(s) interfacing between the paging service partition and the hypervisor are employed. As explained further below, the stream states of the paging service streams (associated with the shared memory partitions) through the VIO adapter(s) are used in a controlled shut-down protocol to ensure that the paging service partition remains operational while the shared memory partitions are powering off responsive, for example, to a system power-off event or an uninterrupted power supply (UPS) event. Described herein are a set of states that the shared memory partition, or more particularly, the paging service streams associated therewith, go through in order to safely shut down the partitions on the computing platform. System shut-down and UPS power events are handled through the same states.

Figure 5:
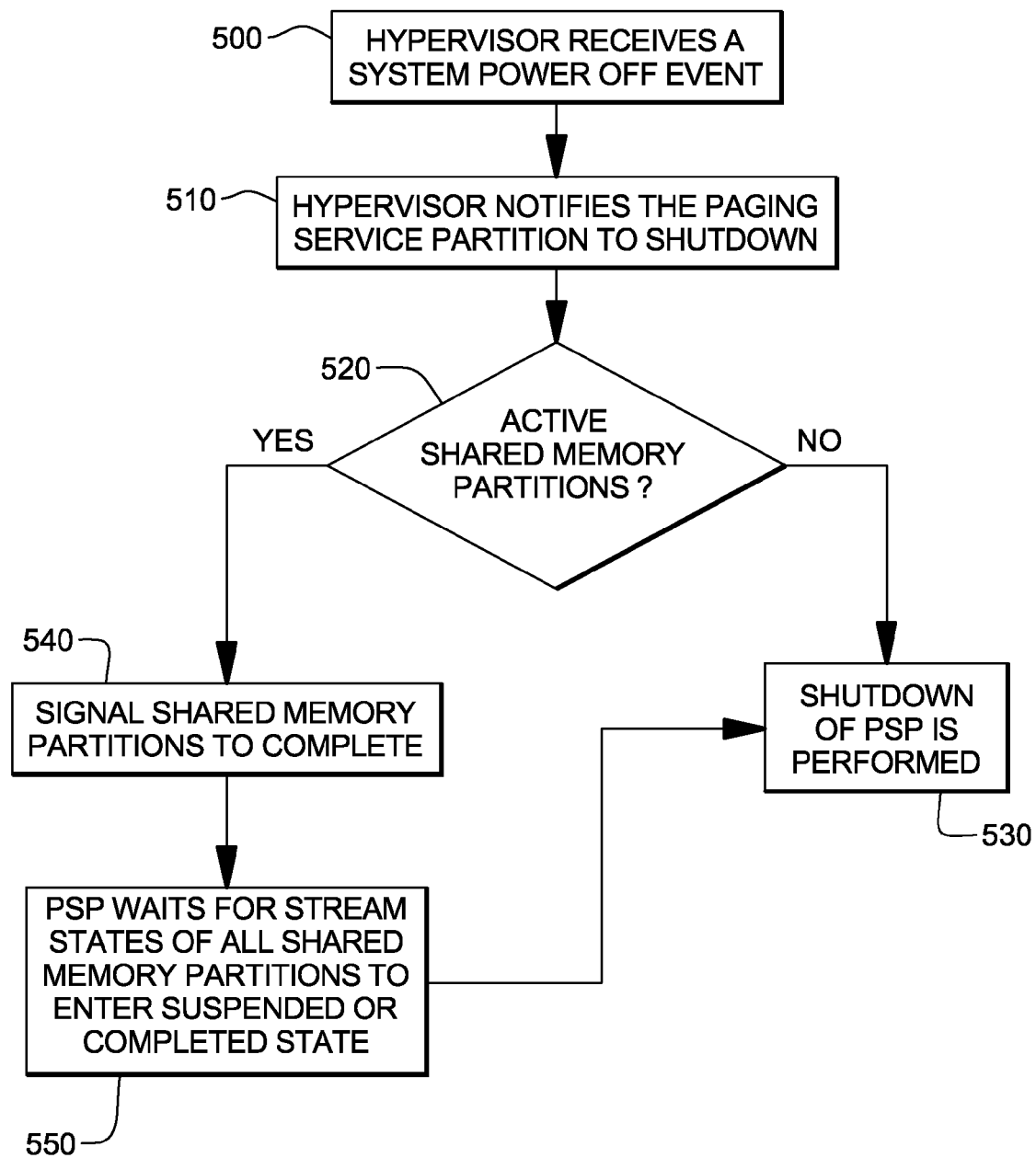
FIG. 5 is a flowchart of one embodiment of logic for controlling partition shut-down within a shared memory partition data processing system during, for example, a system power-off event, in accordance with an aspect of the present invention.

FIG. 5 depicts one embodiment of logic for controlling partition shut-down within a shared memory partition data processing system during, for example, a system power-off event. The hypervisor receives a system power-off event, for example, initiated by a user of the system 500, and notifies the paging service partition to shut down 510. The paging service partition (PSP) determines whether there are any active shared memory partitions 520. This can be accomplished by the PSP viewing the stream states of the paging service streams for the shared memory partitions using the PSP. If there are no active shared memory partitions, then the paging service partition proceeds with automatic shut-down 530. However, if one or more shared memory partition(s) is (are) actively using paging services, then the paging service partition signals the hypervisor to stop paging activity for those partitions by transitioning the active shared memory partition (s) to a complete state 540. This partition complete state could either comprise a suspended state or a completed state for the associated paging service stream. The paging service partition then waits for the stream states of all active shared memory partitions to enter either suspended state or completed state 550, and once all paging activity has stopped, paging service partition shut-down is performed 530. As used herein, suspended state means that the associated shared memory partition is powered off, while completed state refers to the associated shared memory partition being active, but paging activity has stopped and will not be resumed.

Figure 6A:
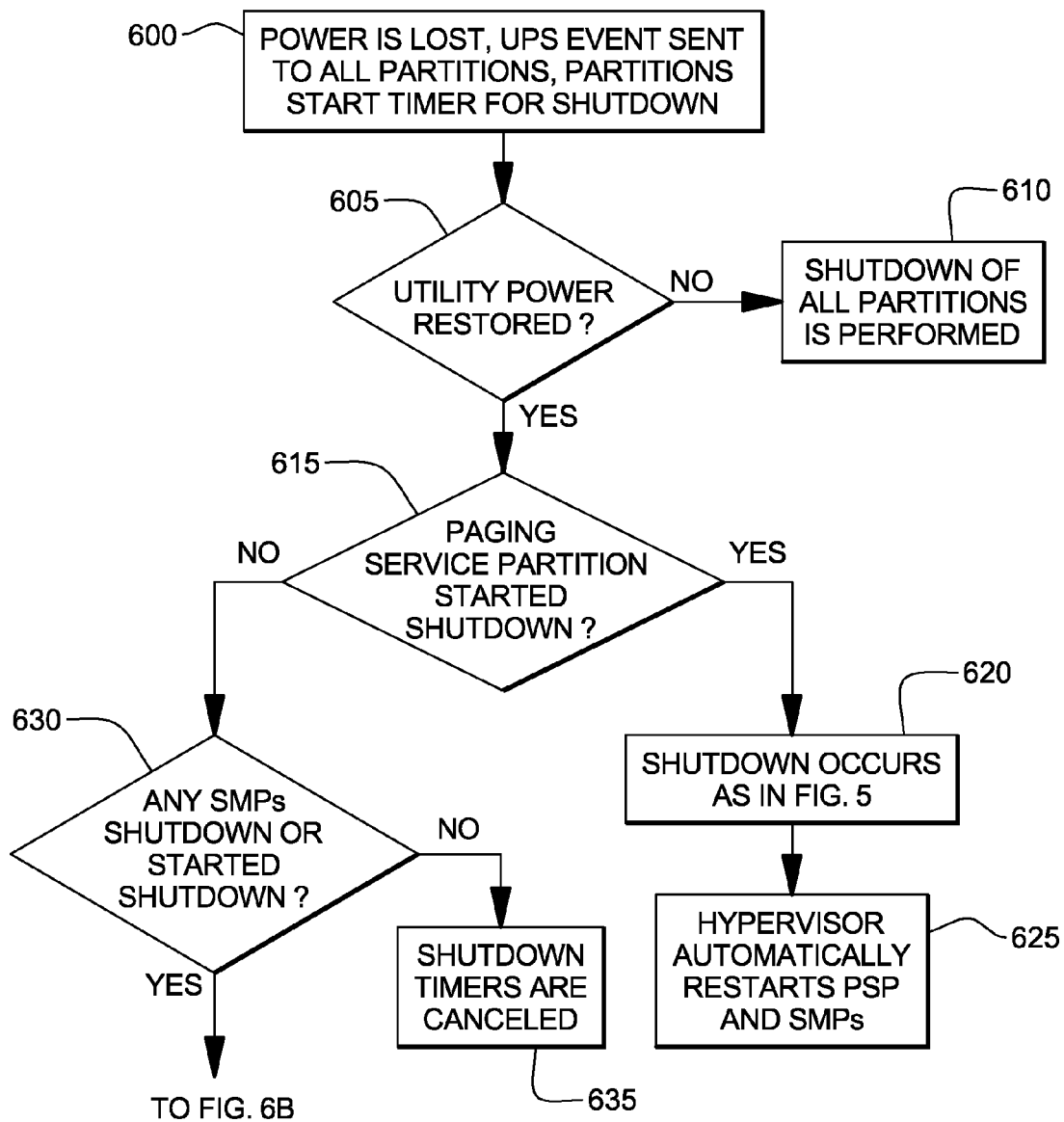
FIGS. 6A & 6B depict a flowchart of one embodiment of logic for controlled shut-down of partitions within a shared memory partition data processing system (with uninterrupted power supply (UPS) back-up) responsive to loss of utility power to the system, in accordance with an aspect of the present invention.
Figure 6B:
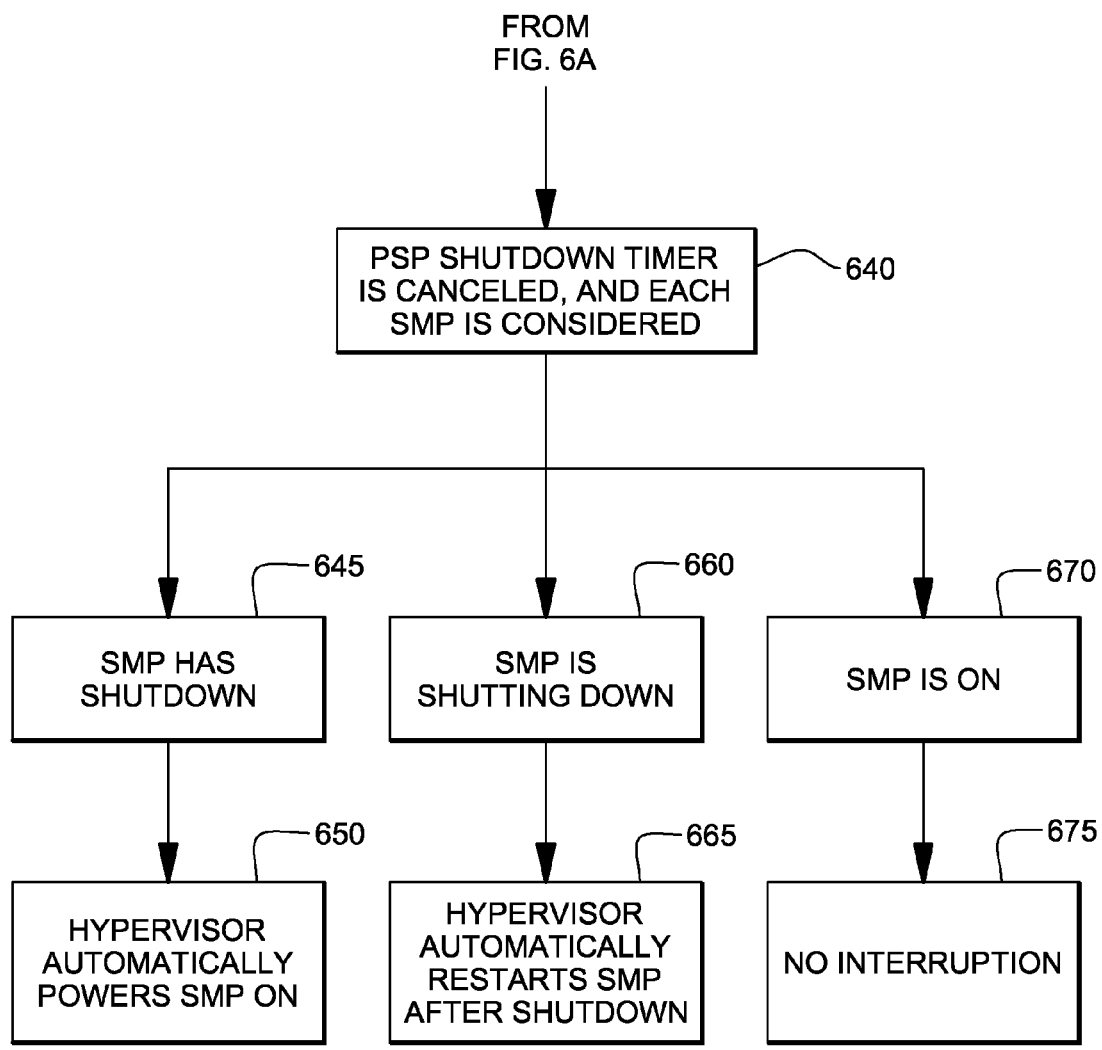

FIGS. 6A & 6B depict an alternate shut-down implementation, wherein an uninterrupted power supply (UPS) is provided with the shared memory partition data processing system.

Upon power being lost, a UPS event signal is sent to all partitions, including the shared memory partitions and paging service partition of the shared memory partition data processing system. Each partition then starts a respective shut-down timer 600. When a shut-down timer expires, the associated partition is to be shut down. The logic monitors for restoration of utility power 605, and if power is not restored, the partitions shut down upon expiration of their respective shut-down timers 610. In one embodiment, shut-down of the partitions proceeds as described above in connection with FIG. 5. Upon restoration of utility power to the shared memory partition data processing system 605, the logic determines whether the paging service partition has started shut-down 615, and if "yes", then the shut-down occurs as described above in connection with FIG. 5 620. After shut-down of the paging service partition and shared memory partition(s), the hypervisor automatically restarts the paging service partition and the shared memory partition(s) 625. If the paging service partition has not started shut-down, then the logic determines whether one or more shared memory partitions have either shut down or have started shut-down 630. If "no", then the shut-down timers associated with the partitions are canceled 635, with the partition(s) remaining operational.

If one or more shared memory partitions have shut-down or have started shut-down when utility power is restored, then, as shown in FIG. 6B, the paging service partition shut-down timer is canceled, and the state of each shared memory partition is considered separately 640. Considering each shared memory partition, if the shared memory partition has shut down 645, then the hypervisor automatically powers the shared memory partition on 650. If the shared memory partition is in the process of shutting down 660, then the hypervisor automatically restarts the shared memory partition(s) after shut-down 665. In this regard, "restart" refers to switching from a power-down state to a power-up state, without the shared memory partition actually being in an off-state between the two. If the shared memory partition is on 670, and has not started shut-down, then there is no interruption to the shared memory partition(s) 675.

Figure 7:
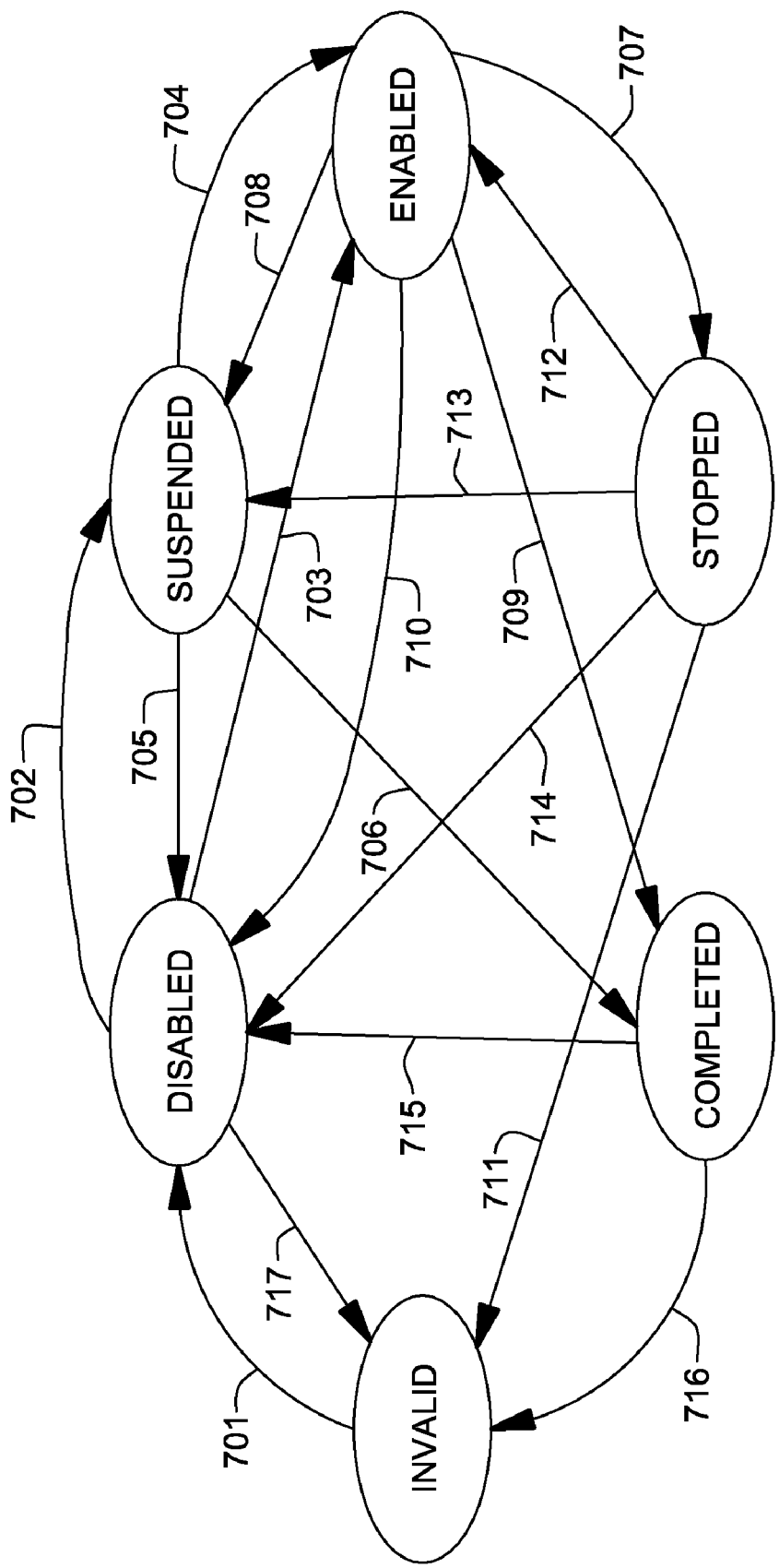
FIG. 7 is a state diagram of possible stream states for paging service streams established between the hypervisor and paging service partition, through one or more virtual input/output (I/O) adapters, wherein each paging service stream is associated with a respective shared memory partition of the data processing system, in accordance with an aspect of the present invention.

FIG. 7 illustrates one embodiment of a state diagram for stream states of the paging service streams for the associated shared memory partitions (SMPs) of the shared memory partition data processing system, in accordance with an aspect of the present invention. These stream states are defined in Table 1 below.

TABLE 1

| State | Description |
| --- | --- |
| Invalid | The stream is invalid. |
| Suspended | The stream is valid, active and the associated SMP is powered off. |
| Enabled | The stream is valid, active and the associated SMP is powered on. |
| Disabled | The stream is valid and inactive. |
| Stopped | The stream is valid, active, but paging activity has been stopped. It may be resumed later. |
| Completed | The stream is valid, active, but paging activity has been stopped and will not be resumed. |

As noted above, the paging service streams through the virtual input/output (VIO) adapter(s) provide an approach for identifying a shared memory partition's state with respect to the paging service partition (PSP). Each paging service stream has associated therewith a stream identification which associates the stream with a particular shared memory partition, and a stream state. The invalid, suspended, enabled, disabled, stopped and completed states are provided as one detailed example of a state diagram for the paging service streams. These states represent the states which the shared memory partition could be in with respect to the paging service partition. Table 2 below sets forth trigger events for transitioning between the stream states.

TABLE 2

| Final State | Trigger |
| --- | --- |
| Disabled | 701 - Allocate stream to SMP. |
| | 705, 710, 714 - PSP shut-down immediate/termination. |
| | 715 - Deactivate stream for SMP. |
| Suspended | 702 - Activate stream/PSP power on (SMP is shut-down). |
| | 708, 713 - SMP is shut-down. |
| Enabled | 703 - PSP power on (SMP is powered on). |
| | 704 - SMP power on. |
| | 712 - PSP is available. |
| Stopped | 707 - Unresponsive Paging Service Partition. |
| Completed | 706, 709 - PSP power off (controlled)/Deactivate Stream/Invalidate Stream. |
| Invalid | 711, 716, 717 - Invalidate Stream |

As shown, a stream state is transitioned from an invalid state to a disabled state upon allocation of the paging service stream to a shared memory partition 701. A stream state is transitioned from disabled to suspended upon activation of a paging service stream or power-on of the paging service partition with the associated shared memory partition being shut down 702. Transition from disabled to enabled 703 occurs when the paging service partition is powered on, and the stream's associated shared memory partition is also powered on. Transition from suspended to enabled 704 occurs when the shared memory partition is powered on. Transition from suspended to disabled 705 occurs when the paging service partition is shut-down immediately in other than a controlled shut-down. A paging service stream is transitioned from suspended to completed 706 when the paging service partition powers off in a controlled manner. A stream transitions from enabled to stop 707 when the paging service partition becomes unresponsive. Transition from enabled to suspended 708 occurs when the shared memory partition is shut-down, while transition from enabled to completed 709 occurs when the paging service partition is powered off in a controlled manner and the paging service stream is deactivated or invalidated. Transition from enabled to disabled 710 occurs with immediate shut-down or termination of the paging service partition. A stream transitions from a stopped state to an invalid state 711 if the stream becomes invalidated, for example, as a result of de-allocation of the stream, and transitions from stopped to enabled 712 if the paging service partition becomes available. A stream state transitions from stopped to suspended 713 when the corresponding shared memory partition is shut-down, and transitions from stopped to disabled 714 if the paging service partition shut-down is immediate in other than a controlled shut-down manner. State transition from completed to disabled 715 occurs if the stream is deactivated for the associated shared memory partition, and from completed to invalid 716 if the paging service stream is invalidated. Similarly, the stream state transitions from disabled to invalid 717 if the paging service stream becomes invalidated.

To summarize, in the event of a system power-off event, the paging service partition (PSP) is configured to hold off its shut-down until all shared memory partitions employing the PSP are properly shut down. The paging service partition accomplishes this by not shutting down until all shared memory partition states are in a queisced state, which is either a suspended or completed state. In order to inform the shared memory partition that the paging service partition is powering off, the paging service partition signals the associated paging service stream to go to a complete state, and if possible, the shared memory partition will begin transferring to that state. State transitions can be transmitted through the VIO adapter(s) from the hypervisor to the paging service partition. The paging service partition shut-down is held and paging requests are continued to be serviced until all shared memory partitions reach the suspended or completed states.

Another instance of the present invention is for uninterruptible power supply (UPS) power events. When a system experiences a UPS event, a notification is sent to each partition to notify them of the event. Each partition in turn then sets a shut-down timer that defines how long the partition will delay until starting its shut-down sequence. If the utility power is restored before shut-down, a notification is sent to each partition and its timer is cancelled. If utility power is not restored, then the partition starts its shut-down upon expiration of the timer.

In the event that utility power is not restored, the system administrator should set the timers correctly on each of the partitions of the system. The paging service partition timer must be longer than all of the timers of the shared memory partitions that it is serving. The shut-down sequence for this case uses the same states and transitions as described above.

In the event that utility power is restored, a few situations can take place. These cases are:
1. Shared memory partitions have not shut-down and the paging service partition has not shut-down. In this case, the shut-down timers in the partitions are simply canceled and no further action is necessary.
2. Some shared memory partitions have shut-down or are starting shut-down and the paging service partition has not shut-down. In this case, the paging service partition will not shut down. The shared memory partitions that are still powered on will not experience any interruption. Any shared memory partition that has started its shut-down will to a restart instead, since the hypervisor informs the partition that the paging service partition has not shut down because of the UPS event. Shared memory partitions that have already shut-down will power-on again.
3. Some shared memory partitions have shut down or are starting shut-down and the paging service partition has started shut-down. In this case, the paging service partition will complete its shut-down once all shared memory partitions are shut down, using the states described above to wait until all associated shared memory partitions are shut-down. Once shut down, the hypervisor restarts the paging service partition and all associated shared memory partitions.

In this way, all shared memory partition shut-downs are safely accomplished, by controlling the shut-down of the paging service partition through the above states and listed hypervisor interactions.

Further details on shared memory partition data processing systems are provided in the following, co-filed patent applications, the entirety of each of which is hereby incorporated herein by reference: "Hypervisor-Based Facility for Communicating Between a Hardware Management Console and a Logical Partition", U.S. Ser. No. 12/403,402; "Hypervisor Page Fault Processing in a Shared Memory Partition Data Processing System", U.S. Ser. No. 12/403,408; "Managing Assignment of Partition Services to Virtual Input/Output Adapters", U.S. Ser. No. 12/403,416; "Automated Paging Device Management in a Shared Memory Partition Data Processing System", U.S. Ser. No. 12/403,426; "Dynamic Control of Partition Memory Affinity in a Shared Memory Partition Data Processing System", U.S. Ser. No. 12/403,440; "Transparent Hypervisor Pinning of Critical Memory Areas in a Shared Memory Partition Data Processing System", U.S. Ser. No. 12/403,447; "Shared Memory Partition Data Processing System with Hypervisor Managed Paging", U.S. Ser. No. 12/403,459; and "Managing Migration of a Shared Memory Logical Partition From a Source System to a Target System", U.S. Ser. No. 12/403,485.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 8:
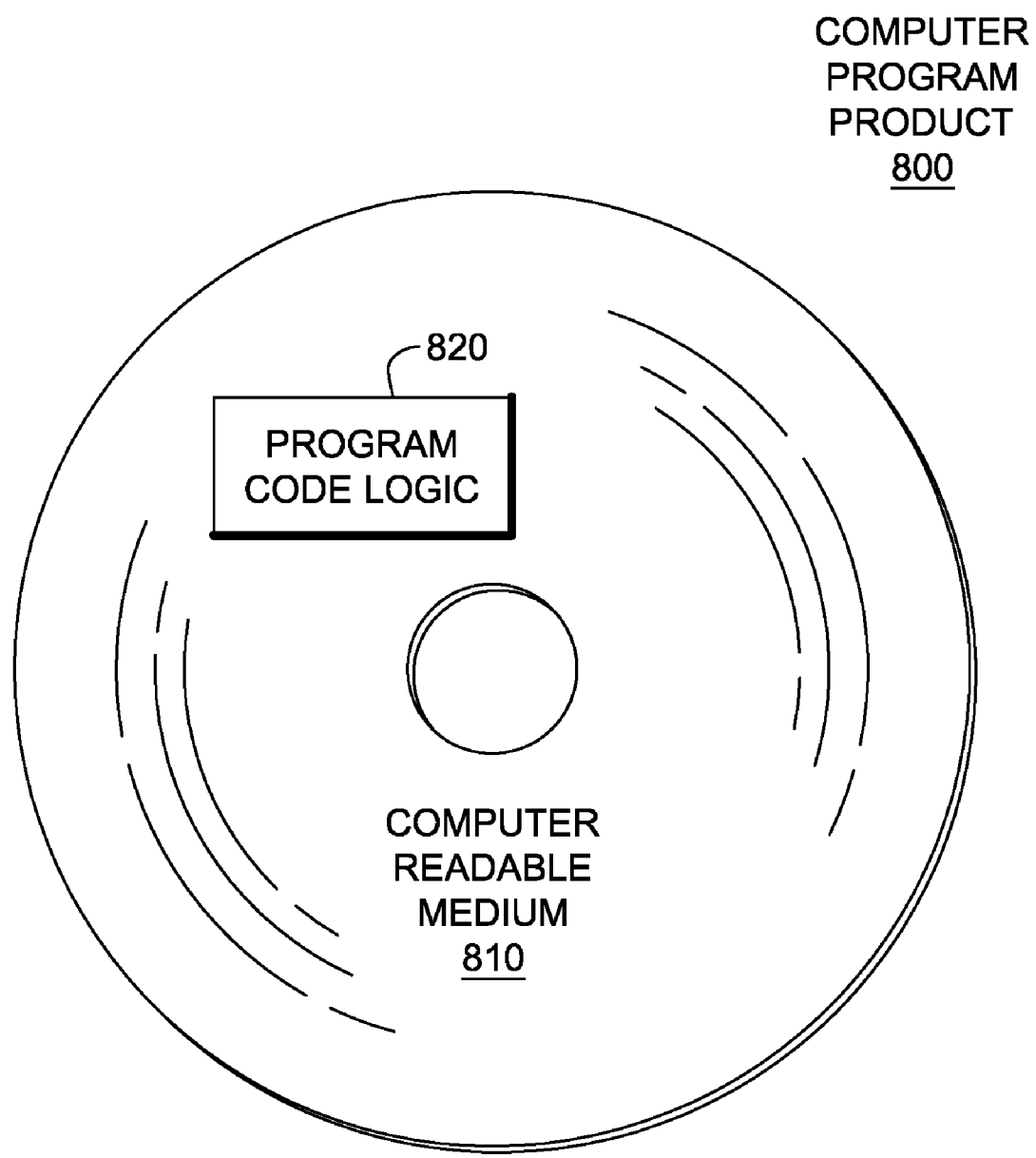
FIG. 8 depicts one embodiment of an article of manufacture or computer program product incorporating one or more aspects of the present invention.

One example of an article of manufacture or a computer program product incorporating one or more aspects of the present invention is described with reference to FIG. 8. A computer program product 800 includes, for instance, one or more computer-readable media 810 to store computer readable program code means or logic 820 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of controlling partition shut-down within a shared memory partition data processing system, the method comprising:
responsive to a shut-down initiating event within a shared memory partition data processing system comprising at least one shared memory partition, a paging service partition, and a hypervisor, notifying, by the hypervisor, the paging service partition to shut down, wherein the shared memory partition data processing system further comprises a shared memory pool of physical memory, the hypervisor managing access to logical memory pages within the shared memory pool by managing page mappings of logical memory pages to physical memory of the shared memory pool for the at least one shared memory partition, and transparently managing page-out of logical memory pages assigned to the at least one shared memory partition from the shared memory pool to one or more external paging devices via the paging service partition, and wherein a respective paging service stream exists between the paging service partition and the hypervisor for each shared memory partition of the at least one shared memory partition, each paging service stream including a stream state; and
responsive to the notifying, determining whether a shared memory partition of the at least one shared memory partition is active, and if yes, signaling, by the paging service partition, the hypervisor to complete paging activity for each shared memory partition that is active, and waiting for the stream state associated with each active shared memory partition to enter one of a suspended state or a completed state before automatically shutting down the paging service partition.

2. The method of claim 1, wherein each paging service stream includes a stream identification for its respective shared memory partition, and the paging service streams are established through at least one virtual input/output (VIO) adapter, each VIO adapter interfacing the hypervisor and the paging service partition.

3. The method of claim 1, further comprising, responsive to the notifying, automatically shutting down the paging service partition if the determining determines that there is no active shared memory partition.

4. The method of claim 1, wherein the shut-down initiating event comprises any one of a system power-off event and a utility power-lost event.

5. The method of claim 1, wherein the shut-down initiating event is a utility power-lost event, and the shared memory partition data processing system further comprises an uninterrupted power supply, and wherein the method further comprises sending an uninterrupted power supply event indication to the at least one shared memory partition and to the paging service partition for starting of respective shut-down timers, wherein upon expiration of a shut-down timer, the respective partition proceeds with shut-down.

6. The method of claim 5, wherein upon restoration of utility power to the shared memory partition data processing system, the method further comprises ascertaining whether the paging service partition started shut-down prior to restoration of utility power, and if so, proceeding with the determining, the signaling and the waiting prior to automatically shutting down the paging service partition, then automatically restarting by the hypervisor the paging service partition and the at least one shared memory partition.

7. The method of claim 6, wherein, upon restoration of utility power to the shared memory partition data processing system, if the paging service partition has started shut-down, then the method further comprises ascertaining whether a shared memory partition of the at least one shared memory partition has shut-down or has started shut-down, and if not, then canceling shut-down timers of the at least one shared memory partition and paging service partition, otherwise, canceling the paging service partition's shut-down timer and for each shared memory partition of the at least one shared memory partition, at least any one of:

determining whether the shared memory partition has shut-down, and if yes, then automatically powering on the shared memory partition by the hypervisor;

determining whether shared memory partition is in the process of shutting down, and if yes, then automatically restarting the shared memory partition by the hypervisor after shut-down of the shared memory partition; and determining whether the shared memory partition is on, and has not started shut-down, and if yes, then leaving the shared memory partition on.

8. A shared memory partition data processing system with partition shut-down control, the shared memory partition data processing system comprising:

at least one processing unit supporting at least one shared memory partition, a paging service partition, and a hypervisor;

a shared memory pool defined within physical memory of the shared memory partition data processing system, the hypervisor managing access to logical memory pages of the shared memory pool by managing page mappings of logical memory pages to physical memory of the shared memory pool for the at least one shared memory partition, and transparently managing page-out of logical memory pages assigned to the at least one shared memory partition from the shared memory pool to one or more external paging devices via the paging service partition, and wherein a respective paging service stream exists between the paging service partition and the hypervisor for each shared memory partition of the at least one shared memory partition, each paging service stream including a stream state; and wherein partition shut-down within the shared memory partition data processing system is controlled by the hypervisor notifying the paging service partition to shut-down responsive to a shut-down initiating event within the shared memory partition data processing system, the paging service partition responding thereto by determining whether a shared memory partition of the at least one shared memory partition is active, and if yes, by signaling, by the paging service partition, the hypervisor to complete paging activity for each shared memory partition that is active, and waiting for the stream state associated with each active shared memory partition to enter one of a suspended state or a completed state before automatically shutting down.

9. The shared memory partition data processing system of claim 8, wherein each paging service stream includes a stream identification for its respective shared memory partition, and the paging service streams are established through at least one virtual input/output (VIO) adapter, each VIO adapter interfacing the hypervisor and the paging service partition.

10. The shared memory partition data processing system of claim 8, wherein the paging service partition responds to notification by the hypervisor to shut-down by automatically shutting down if it determines that there is no active shared memory partition.

11. The shared memory partition data processing system of claim 8, wherein the shut-down initiating event comprises any one of a system power-off event and a utility power-lost event.

12. The shared memory partition data processing system of claim 8, wherein the shut-down initiating event is a utility power-lost event, and the shared memory partition data processing system further comprises an uninterrupted power supply, wherein an uninterrupted power supply event indication is sent to the at least one shared memory partition and to the paging service partition responsive to the utility power-lost event, the uninterrupted power supply event indication resulting in setting of respective shut-down timers within the at least one shared memory partition and the shared paging service partition, wherein upon expiration of a shut-down timer, the respective partition proceeds with shut-down if utility power has not been restored.

13. The shared memory partition data processing system of claim 12, wherein upon restoration of utility power to the shared memory partition data processing system, the system ascertains whether the paging service partition started shut-down prior to restoration of utility power, and if so, proceeds with shutting down of the paging service partition, and thereafter, automatically restarting by the hypervisor the paging service partition and the at least one shared memory partition.

14. The shared memory partition data processing system of claim 13, wherein, upon restoration of utility power to the shared memory partition data processing system, if the paging service partition has started shut-down, then the system ascertains whether a shared memory partition of the at least one shared memory partition has shut-down or has started shut-down, and if not, then cancels shut-down timers of the at least one shared memory partition and the paging service partition, otherwise, the system cancels the paging service partition's shut-down timer, and for each shared memory partition of the at least one shared memory partition, at least any one of:

determines whether the shared memory partition has shut down, and if yes, then automatically powers on by the hypervisor the shared memory partition;

determines whether the shared memory partition is in the process of shutting down, and if yes, then automatically restarts the shared memory partition by the hypervisor after shutting down the shared memory partition; and determines whether the shared memory partition is on, and has not started shut-down, and if yes, then leaves the shared memory partition on.

15. An article of manufacture comprising:

at least one non-transitory computer-readable medium having computer-readable program code logic to control partition shut-down within a shared memory partition data processing system, the computer-readable program code logic when executing on a processor performing:

responsive to a shut-down initiating event within a shared memory partition data processing system comprising at least one shared memory partition, a paging service partition, and a hypervisor, notifying, by the hypervisor, the paging service partition to shut down, wherein the shared memory partition data processing system further comprises a shared memory pool within physical memory, the hypervisor managing access to logical memory pages of the shared memory pool by managing page mappings of logical memory pages to physical memory of the shared memory pool for the at least one shared memory partition, and transparently managing page-out of logical memory pages assigned to the at least one shared memory partition from the shared memory pool to one or more external paging devices via the paging service partition, and wherein a respective paging service stream exists between the paging service partition and the hypervisor for each shared memory partition of the at least one shared memory partition, each paging service stream including a stream state; and responsive to the notifying, determining whether a shared memory partition of the at least one shared memory partition is active, and if yes, signaling, by the paging service partition, the hypervisor to complete paging activity for each shared memory partition that is active, and waiting for the stream state associated with each active shared memory partition to enter one of a suspended state or a completed state before automatically shutting down the paging service partition.

16. The article of manufacture of claim 15, wherein each paging service stream includes a stream identification for its respective shared memory partition, and the paging service streams are established through at least one virtual input/output (VIO) adapter, each VIO adapter interfacing the hypervisor and the paging service partition.

17. The article of manufacture of claim 15, wherein the shut-down initiating event comprises any one of a system power-off event and a utility power-lost event.

18. The article of manufacture of claim 15, wherein the shut-down initiating event is a utility power-lost event, and the shared memory partition data processing system further comprises an uninterrupted power supply, and wherein the method further comprises sending an uninterrupted power supply event indication to the at least one shared memory partition and to the paging service partition for starting of respective shut-down timers, wherein upon expiration of a shut-down timer, the respective partition proceeds with shut-down.

19. The article of manufacture of claim 18, wherein upon restoration of utility power to the shared memory partition data processing system, the computer-readable program code logic ascertains whether the paging service partition started shut-down prior to restoration of utility power, and if so, proceeds with the determining, the signaling and the waiting prior to automatically shutting down the paging service partition, then automatically restarting by the hypervisor the paging service partition and the at least one shared memory partition.

20. The article of manufacture of claim 19, wherein, upon restoration of utility power to the shared memory partition data processing system, if the paging service partition has started shut-down, then the computer-readable program code logic ascertains whether a shared memory partition of the at least one shared memory partition has shut-down or has started shut-down, and if not, then cancels shut-down timers of the at least one shared memory partition and paging service partition, otherwise, cancels the paging service partition's shut-down timer and for each shared memory partition of the at least one shared memory partition, at least any one of:
    determines whether the shared memory partition has shut-down, and if yes, then automatically powering on the shared memory partition by the hypervisor;
    determines whether shared memory partition is in the process of shutting down, and if yes, then automatically restarting the shared memory partition by the hypervisor after shut-down of the shared memory partition; and
    determines whether the shared memory partition is on, and has not started shut-down, and if yes, then leaving the shared memory partition on.

* * * * *